Figure 1:
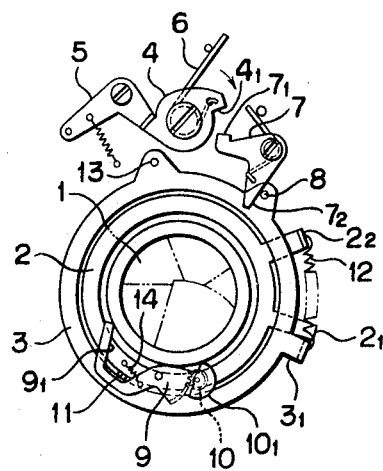

United States Patent
Goshima

[15] 3,662,664
[45] May 16, 1972

[54] CAMERA SHUTTER INCORPORATING A GOVERNOR MECHANISM

[72] Inventor: Takeshi Goshima, Tokyo, Japan
[73] Assignee: Canon Camera Kabushiki Kaisha, Tokyo, Japan
[22] Filed: June 6, 1966
[21] Appl. No.: 555,316

Related U.S. Application Data

[63] Continuation of Ser. No. 373,383, June 8, 1964, abandoned.

[30] Foreign Application Priority Data

June 20, 1963 Japan..................................38/32348

[52] U.S. Cl.................................................95/63
[51] Int. Cl. ...........................................G03b 9/58
[58] Field of Search......................................95/63, 64

[56] References Cited

UNITED STATES PATENTS

| | | | |
|---|---|---|---|
| 2,081,727 | 5/1937 | Barenyi | 58/116 |
| 3,051,065 | 8/1962 | Kobayashi | 95/63 X |
| 3,165,996 | 1/1965 | Kiper | 95/64 |
| 3,169,462 | 2/1965 | Kessler | 95/63 |
| 3,117,503 | 1/1964 | O'Hara | 95/64 X |
| 3,121,380 | 2/1964 | Millhouse | 95/64 |
| 3,199,425 | 8/1965 | Starp | 95/64 X |

*Primary Examiner*—John M. Horan
*Attorney*—Anton J. Wille

[57] ABSTRACT

Lens shutter for a camera in which the shutter blades determine the exposure time and the diaphragm opening, the shutter blades being rotatably mounted on one rotatable ring and interconnected with a second ring rotatable relative to the first ring, a governor mechanism being provided on either of the two rings and cooperating with the other of the two rings to provide a shutter speed control in accordance with the diaphragm setting.

6 Claims, 2 Drawing Figures

3,662,664

CAMERA SHUTTER INCORPORATING A GOVERNOR MECHANISM

This application is a continuation of my copending application bearing Ser. No. 373,383 filed on June 8, 1964, and now abandoned.

This invention relates to a camera shutter wherein the shutter blades perform the dual functions of providing a timed exposure and a preset diaphragm opening, and more particularly to a camera shutter of the character indicated in which a governor mechanism is incorporated to provide automatically a correct exposure time for the aperture setting.

In camera shutters as presently devised, diaphragm blades and shutter blades are separately provided, the shutter setting and diaphragm setting mechanisms being interlocked with an exposure control mechanism whereby the shutter or the diaphragm settings are adjusted to provide a correct exposure for the particular light conditions. In one instance wherein the camera shutter is provided with dual function shutter blades, the shutter timing mechanism and the diaphragm setting mechanism are separate units coacting to perform the desired function of providing a correct exposure, the separate units being quite complicated, comprising a multiplicity of parts and adding weight and bulk to the camera preventing the use of such an arrangement in miniature cameras.

The object of the present invention is to provide a camera shutter having dual purpose shutter blades wherein a governor mechanism of relatively simple construction is incorporated in the shutter mechanism, the governor mechanism being such that a setting of the desired diaphragm opening automatically setting the exposure time for the blades.

Figure 2:
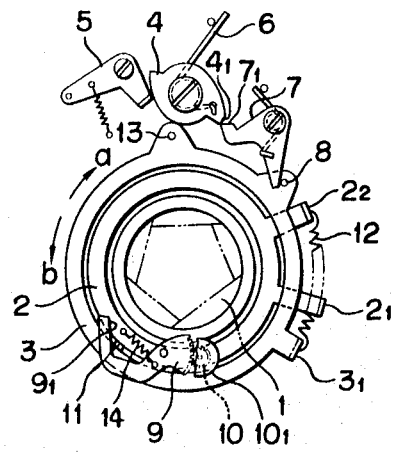

Other objects, advantages and features of this invention will become more apparent from the following description of an illustrative embodiment in conjunction with the drawing in which:

FIG. 1 is a front view of one embodiment of the speed governor for lens shutter according to this invention showing shutter is closed; and FIG. 2 is a front view of the embodiment shown in FIG. 1 with the shutter actuated to an open position.

Now referring to the drawing, shutter blades 1 are rotatably mounted on ring 2 each of the blades being also connected to ring 3 through pin and an elongated aperture (not shown), so as to be opened and closed as ring 3 is reciprocatingly rotated in the directions, respectively, of arrows $a$ and $b$ (FIG. 2), respectively. The size of the aperture formed by the shutter blades is determined by the magnitude of the stroke of the ring 3 relative to the ring 2. The adjustment of the stroke of ring 3 is performed in such manner that rings 2 and 3 are rotated to some angle displacement as a unit by the engagement of projections $2_1$ and $3_1$ formed on the respective rings by means of an exposure adjustment device (not shown), while shutter blades 1 remain closed. In other words, this adjustment of the stroke is made by a driving lever 4, which has been released from a release lever 5, the driving lever being rotated by a driving spring 6 in the direction of the arrow in FIG. 1 to move a pin 8 secured in the ring 3 by a lever 7 with the result that ring 3 is rotated thereby adjusting the relative position of lever 7 to pin 8 when shutter blades 1 are opened. It will be noted that the associated mechanism between driving lever 4 and ring 3 should not be limited to the embodiment shown in the drawing. The invention will now be explained in greater detail.

The setting of an exposure condition is made by rotating ring 2 to a predetermined position by means of its not shown exposure adjustment device. Consequently ring 2 will be at a fixed position with respect to the predetermined exposure condition. The ring 3 is tensioned in the anticlockwise direction in the drawing by a spring 12 provided between projection $3_1$ of ring 3 and projection $2_2$ of ring 2. An arm portion of the projection $3_1$ is bent downwardly as viewed in the drawing and extends into the path of the projection $2_1$ so that the ring 3 moves in unison with ring 2 as the latter moves in the anticlockwise direction, with the result that ring 3 is set to the predetermined position according to the rotation of ring 2.

As mentioned above, since ring 2 and 3 rotate as a unit about the optical axis when setting the exposure condition, the shutter blades 1 are not actuated and the shutter remains closed. Accordingly and dependent on the exposure condition set, the location of pin 8, supported in ring 3, relative to the location and position of lever 7 varies, with the angular displacement of ring 3 relative to ring 2 when lever 7 moves the definite angular distance as the shutter is driven, and thus the shutter blades open corresponding to the aperture size of the set predetermined exposure condition.

As aforementioned, the opening and closing operation of blades 1 is by reciprocatingly moving ring 3 relative to ring 2. Ring 3 is driven to open the shutter blades in such manner that when the not shown shutter button is depressed, release lever 5 rotates in the clockwise direction to release driving lever 4. The spring 6 rotates the driving lever clockwise so that the driving lever end $4_1$ strikes end $7_1$ of lever 7 to rotate lever 7 anticlockwise pushing pin 8 by its other end $7_2$ to rotate ring 3 clockwise while ring 2 being retained as shown in FIG. 2. On the other hand, ring 3 closes the shutter blades in such manner that when they are open to the aperture size corresponding to the predetermined and set exposure condition, is rotated anticlockwise when the driving lever end $4_1$ disengages lever end $7_1$, thereafter striking pin 13 on the ring 3 to rotate the ring 3 anticlockwise. At this time, although ring 3 is moved, ring 2 does not move because of the frictional force imparted to ring 2 and tensioned spring 12 playing a substantial role in assisting in the rotation of ring 3 in anticlockwise direction and thus the closure of the shutter blades. In the succeeding clockwise rotation of lever 4, its end $4_1$ leaves pin 13, and the shutter blades are fully closed, restored to their original position when projection $3_1$ of ring 3 again contacts projection $2_1$ of ring 2.

The shutter blades of the instant invention also serve as stop blades, the opening size of the shutter blades and the opening time of the shutter blades being controlled as follows:

The opening size of the shutter blades is predetermined according to the stroke of the movement of ring 3 relative to ring 2, the stroke of ring 3 being determined, as aforementioned, by setting ring 2 to a predetermined position according to the preselected exposure condition, at which time ring 3 is rotated in unison with ring 2, with the result that the location of pin 8 of ring 3, relative to lever 7, varies. In other words, when projection $2_1$ is set to a lower position in the drawing, the arcuate movement of pin 8 in accordance with lever 7 decreases; that is, the stroke of ring 3 relative to ring 2 is decreased so that the size of the opening of the shutter blades is decreased; while when projection $2_1$ of ring 2 is set to a higher position in the drawing, the arcuate movement of pin 8 in accordance with lever 7 increases and the stroke of ring 3 relative to ring 2 is increased to increase the aperture size of the shutter-and-stop blades.

The opening and closing time of the blades is controlled by a governor which comprises a sector gear 9, freely rotatable on ring 2 (or ring 3), and pinion 10 having an inertia body $10_1$, the pinion 10 being rotatably mounted on ring 2 (or ring 3) and interlocking with sector gear 9. The latter is normally rotatable clockwise by spring 14, with the other end of such sector gear forming lever $9_1$ cooperating with a projection 11 on ring 3 (or ring 2) having a curved surface as shown. When ring 2 is set to a position to decrease the aperture size formed by blades 1, projection 11 on ring 3 (in this embodiment projection 11 is on ring 3) does not contact with lever $9_1$ of the sector gear, with the result that the movement of ring 3 relative to ring 2 is at a high speed. In other words, the smaller the aperture size of shutter blades, the shorter the shutter opening time. When the position of ring 2 is shifted to an upper position in the drawing to increase aperture size of shutter blades, the stroke of ring 3 relative to ring 2, when shutter is actuated, increases with the result that the maximum aperture ratio of the shutter-and-stop blades increases. And at the same time, the interlocking amount of projection 11 on ring 3 to lever $9_1$ of sector gear 9 increases to increase braking force produced by the governor to ring 3, with the result that the speed of the movement of ring 3 relative to ring 2 becomes slow. Thus the opening time of the shutter blades becomes longer as opening size of shutter blades becomes larger. It is to be noted that the relationship between opening size of shutter blades and the shutter speed is determined by the configuration of the curvature of the surface formed on lever $9_1$ to be contacted with projection 11. As explained, in accordance with the present invention, shutter aperture size and shutter speed can simultaneously be changed by the blades 1 serving both as shutter blades and stop blades, and when the diaphragm opening increases, the shutter speed decreases (or shutter opening time increases), in such a case as the present invention where a set of diaphragm opening size and shutter speed is predetermined for a specific exposure and a specific brightness of the object to be photographed as described in U.S. Pat. No. 2,999,438.

It will be understood that this invention is not limited to the specific embodiment shown in the drawing and the explanation thereto, but can be carried with various modifications without departing from the scope of the invention as defined in the appended claims.

What is claimed is:

1. A camera lens shutter, comprising
a plurality of overlapping shutter blades disposed in a plane perpendicular to the longitudinal axis of the lens for serving both as a shutter and a diaphragm;
an actuating ring for opening and closing the shutter blades disposed in a plane parallel to the plane of the shutter blades and connected to said shutter blades to actuate said blades upon rotation thereof;
a driving member for driving said actuating ring when an exposure is made;
a regulating ring for presetting an exposure value to adjust the opening size and the opening duration of the shutter blades when the shutter blades are actuated, said ring being disposed in a plane parallel to said actuating ring to support said shutter blades for their opening and closing;
means for connecting said actuating ring to said regulating ring to rotate the same in unison in adjusting said regulating ring according to the exposure value and for changing the amount of rotation of said actuating ring by said driving means according to the exposure value;
a governor member supported on one of said two rings for adjusting shutter speed; and
a cooperating member cooperating with said governor member disposed on the other of said rings thereby controlling shutter speed at the exposure setting by the relative movement between said two rings.

2. A camera lens shutter, comprising
a first ring and a second ring in juxtaposition, both rings being coaxial with the lens axis;
a plurality of shutter blades rotatably mounted on the first ring and connected to the second ring,
projections on said rings,
resilient means interconnecting the two rings and biasing the rings to abut the projections on the respective rings to permit rotation of the rings in unison to maintain the shutter blades closed upon rotation of the first ring to set the diaphragm opening,
a first pin on the second ring positionable thereby upon rotation thereof,
a biased lever in the path of the first pin,
a driving lever for moving the biased lever upon release of the camera shutter release button to rotate the second ring through the first pin relative to the first ring to open the shutter blades,
a second pin on the second ring spaced from the first pin, said second pin being in the path of movement of the driving lever and abutted thereby to rotate the second ring relative to the first ring to close the shutter blades, and
a governor mechanism including a governor member mounted on one of the rings and a projection on the other of said rings for abutment by the governor member, the degree of abutment being determined by rotation of the second ring.

3. A camera lens shutter according to claim 2, wherein the biased lever is pivotably mounted and biased in one direction, and the driving lever is pivotably mounted and biased in a direction opposite to the one direction.

4. A camera lens shutter according to claim 2, wherein the governor member comprises
a pivotable sector gear including a lever arm, and
a pinion meshing with the sector gear and formed with an inertia body, the lever arm being formed with a curved surface cooperating with projection on the other of said rings.

5. A camera lens shutter according to claim 1, wherein the governor member and cooperating member include
a pivotable sector gear mounted on one ring,
an extending lever on said sector gear formed with a curved surface,
a projection on the other ring engaged by the lever arm curved surface, the degree of engagement of the curved surface and projection being determined by the relative rotation of the two rings, and
a pinion rotatably mounted on the one ring and meshing with the gear sector, said pinion being provided with an inertia body.

6. A camera lens shutter according to claim 2 wherein the governor mechanism includes
a pivotable sector gear mounted on one ring,
an extending lever on said sector gear formed with a curved surface,
a projection on the other ring engaged by the lever arm curved surface, the degree of engagement of the curved surface and projection being determined by the relative rotation of the two rings, and
a pinion rotatably mounted on the one ring and meshing with the gear sector, said pinion being provided with an inertia body.

* * * * *